(12) United States Patent
Hennes

(10) Patent No.: US 7,736,140 B2
(45) Date of Patent: Jun. 15, 2010

(54) INTERIOR COOLING BODY FOR A BLOWFILM SYSTEM, BLOWFILM SYSTEM, AND PROCESS FOR PRODUCING A BLOWFILM

(75) Inventor: Jochen Hennes, Frankfurt (DE)

(73) Assignee: Kiefel Extrusion GmbH, Worms (DE)

( * ) Notice: Subject to any disclaimer, the term of this patent is extended or adjusted under 35 U.S.C. 154(b) by 684 days.

(21) Appl. No.: 11/641,525

(22) Filed: Dec. 19, 2006

(65) Prior Publication Data

US 2007/0267183 A1 Nov. 22, 2007

(30) Foreign Application Priority Data

Dec. 20, 2005 (DE) ........................ 10 2005 060 979

(51) Int. Cl.
*B29C 47/90* (2006.01)
(52) U.S. Cl. .................. 425/72.1; 425/326.1; 425/380; 425/467
(58) Field of Classification Search ................ 425/72.1, 425/326.1, 380, 467
See application file for complete search history.

(56) References Cited

U.S. PATENT DOCUMENTS

| | | | |
|---|---|---|---|
| 2,966,700 A | | 1/1961 | Dyer et al. |
| 3,092,874 A | * | 6/1963 | Fallwell ..................... 264/40.3 |
| 3,650,644 A | | 3/1972 | Ebert et al. |
| 4,204,819 A | | 5/1980 | Ushioda et al. |
| 4,220,620 A | | 9/1980 | Clifford |
| 4,251,199 A | | 2/1981 | Imaizumi et al. |
| 4,606,879 A | * | 8/1986 | Cerisano ..................... 264/565 |
| 4,938,903 A | | 7/1990 | Schaeffer et al. |
| 4,955,802 A | | 9/1990 | Halter et al. |
| 5,354,190 A | * | 10/1994 | Hofer et al. ................ 425/72.1 |
| 5,576,029 A | | 11/1996 | Planeta |

FOREIGN PATENT DOCUMENTS

| | | |
|---|---|---|
| AT | 315 472 | 5/1974 |
| DE | 1 211 379 A1 | 1/1959 |
| DE | 1 504 648 | 6/1961 |
| DE | 26 08 311 A1 | 9/1977 |
| DE | 26 39 551 A1 | 3/1978 |
| DE | 29 24 897 A1 | 6/1980 |
| DE | 38 15 415 A1 | 11/1989 |
| DE | 38 20 530 | 12/1989 |
| DE | 39 03 174 A1 | 8/1990 |
| EP | 1 595 686 A1 | 11/2005 |
| FR | 2 440 266 | 5/1980 |
| GB | 2 166 081 | 4/1986 |
| JP | 60-049911 | 3/1985 |
| JP | 60-125623 | 7/1985 |
| NL | 7802372 | 9/1978 |

OTHER PUBLICATIONS

German Office Action with English translation Sep. 14, 2006.

\* cited by examiner

*Primary Examiner*—Robert B Davis
*Assistant Examiner*—Joseph Leyson
(74) *Attorney, Agent, or Firm*—Collard & Roe, P.C.

(57) ABSTRACT

Numerous aspects concerning a blow film system are improved by the present invention.

15 Claims, 1 Drawing Sheet

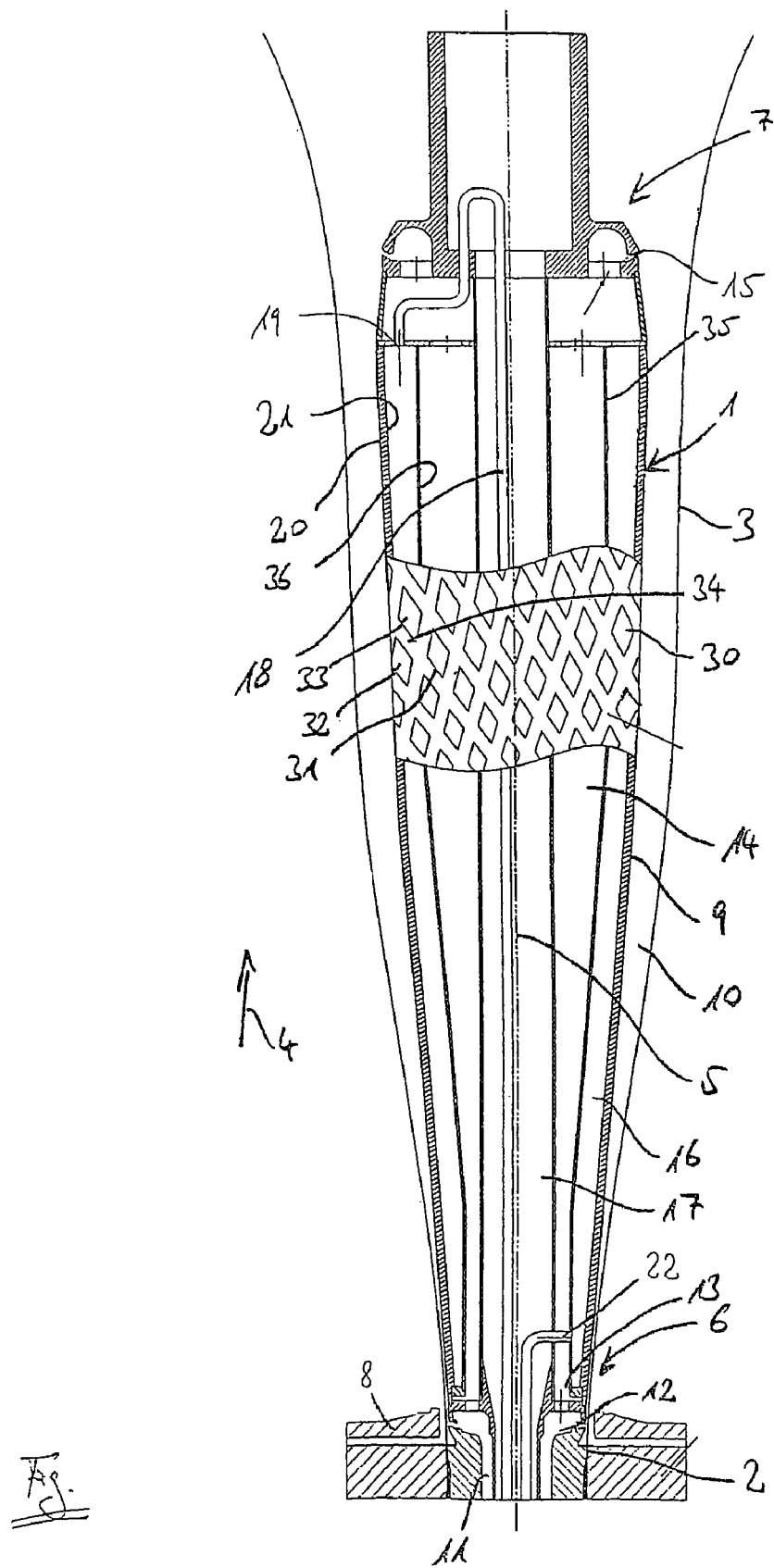

INTERIOR COOLING BODY FOR A BLOWFILM SYSTEM, BLOWFILM SYSTEM, AND PROCESS FOR PRODUCING A BLOWFILM

CROSS REFERENCE TO RELATED APPLICATIONS

Applicant claims priority under 35 U.S.C. §119 of German Application No. 10 2005 060 979.1 filed Dec. 20, 2005.

BACKGROUND OF THE INVENTION

1. Field of the Invention

The invention concerns an interior cooling body for a blown film system, a blown film system, and a process for producing a blown film.

2. The Prior Art

Blown film systems are used for producing large scale films in the form of tubes from thermoplastic synthetic material.

DE 1 211 379 shows a system wherein a tube is produced from an annular slit valve. The tube is widened by introducing blown air between the valve and a water-operated cooling body.

DT 26 08 311 A1 shows a system wherein the tube is cooled down at its interior side by a water-operated cooling body, whereas at its exterior side, the tube is in direct contact with the water. The exterior cooling water runs downwards along the tube. Thus, the system is used for plants extruding from top to bottom.

DE 39 03 174 A1 shows a blown film system with a cooling cylinder within the tube with four cooling air grooves running around the cooling cylinder at four discrete points of height.

DE 29 24 897 A1 shows a cylindrical stabilizer for a resin bubble which heats and widens the bubble from the interior side. On the outside, there is a cooling air fan. The interior stabilizer has concave and convex engraved and cut patterns, especially in the form of grooves.

DE 1 504 648 shows a system for cooling a film tube by blown air running along a water-operated interior cooling body with a sand-blasted surface.

Further systems are known from U.S. Pat. No. 3,650,644, AT 315 472, DE 26 39551 A1, and DE 38 15415 A1.

SUMMARY OF THE INVENTION

One goal of the invention is to improve the systems and methods known in the art.

According to a first aspect of the invention, this goal is reached by an interior cooling body for a blown film system, wherein the cooling body has a surface nappe, wherein there are stream channels provided in the nappe, the run of which extends at least over a part of a longitudinal extension of the cooling body.

This aspect of the invention is based on the realization that the providing of stream channels in the nappe of the cooling body causes turbulences, which improve the cushioning effect of the blown air. By this effect, in at least the major part of the blown film, contact between the film and the cooling body can be avoided. Even if some contact happens between the film tube and the cooling body nappe, this contact is not problematic, since the stream channels are not perpendicular to a longitudinal extension of the body, but they rather have a component which can be projected onto the longitudinal axis of the cooling body.

In addition to this effect, the turbulences between the blown film tube and the cooling body effect a higher transport of heat energy, which enables the tube to cool down more quickly. This feature results in a high flow rate.

It may be pointed out that there is not necessarily a need for absolutely avoiding any contact between the blown film tube and the cooling body. The blown film, however, gets a higher quality if at least uncontrolled contact is avoided. It may even be desired to establish contact in order to produce a certain surface character of the film, for example a higher surface roughness.

According to a second aspect of the invention, the goal is reached by an interior cooling body for a blown film system with a nappe, with an inwardly neighboring cooling fluid areal guidance, wherein the cooling fluid areal guidance comprises an annular cross section with an air guidance provided in its interior.

In the terminology, it may be explained that a fluid guidance being neighboring "inwardly" to the nappe means that the fluid guidance is positioned closer to a longitudinal axis of the cooling body. Normally, the cooling body will by at least in general rotation-symmetrical and will have a longitudinal symmetry axis. In this case, a position neighboring inwardly means that the fluid guidance is positioned radially inwards of the nappe.

Further to the terminology, it may be explained that a "cooling fluid areal guidance" is a guidance for an arbitrary cooling fluid, especially for water, which enables the fluid to communicate with the surface of the cooling body via an area in order to cool down the blown air passing on the outside of the surface.

This aspect is based on the realization that such an interior structure of a cooling body is of advantage. Within the interior of a film being extruded in a blown film plant, there is often only little room for bringing in cooling media. A structure as described has the advantage that the cooling of the cooling body surface is performed by water, which is very efficient. At the same time, the water is guided through the cooling body in an annular walling, so that a space for an air guidance is provided in the interior of the fluid guidance. The air guidance can cool down the cooling water radially from the interior side, and the interior air guidance, for example in the form of a central air duct, can be used for transporting blown air to the head of the cooling body. There, the blown air can be added to the bolstering blown air stream, e.g. be conducted into same so that there is a higher air stream at the head of the cooling body. This higher air stream can be used in order to widen the film tube.

A further effective use of the room provided is achieved if in the air guidance, there is provided a cooling fluid lead which is connected to the cooling fluid areal guidance. For example, a pipe or a hose for the cooling fluid can run through the central air duct. Such a lead can easily be maintained, since it is located in the air duct and therefore rather freely accessible.

According to a third aspect of the invention, the goal is reached by an interior cooling body for a blown film system with a cooling fluid areal guidance with an annular cross section in a double-walled jacket or nappe.

It has already been explained that the cooling fluid must often be led inside the cooling body under narrow room conditions, because within the film tube, there is often only little room. If the cooling fluid areal guidance is provided in a double-walled jacket of the cooling body, the construction of same is rather simple, and the cooling fluid is in direct contact with the outer double-wall of the cooling body, i.e. with the surface or nappe wall.

According to a fourth aspect of the invention, the goal is reached by an interior cooling body for a blown film system, having a length of between approx. 0.5 m or approx. 1 m up to approx. 3 m, and having the shape of a cone base, i.e. a frustrum.

It has been found out that a frustrum shape is of advantage for an interior cooling body especially if same has a greater length. By this shape, a continuous widening of the film tube can be reached already in the area of the lower cooling, which is where the blown air makes a bolstering stream for the film tube around the cooling body. In spite of the girth being widened rather much in its rather hot and soft condition, good quality of the film surface can be achieved. By using the long, frustrum-shaped cooling body, the film tube seems to be widen very homogeneously.

Good results have been found especially for a length of at least 0.5 m or at least 1 m and also around approx. 1.5 m.

It may be pointed out that a "frustrum" shape is not to be understood in its mathematically precise sense. Rather, preferred embodiments can be reached already if the cooling body has at least over the biggest part of its length a surface gradient which enlarges the girth, so that the cooling body has the greater part of its length extension being formed as to widen the body, and the smaller part being formed as to reduce the girth. Especially, a shape may be considered in which the girth widens over at least 70%, 80% or 90% of the length between cooling body foot and head. In an experiment, also a slight barrel shape proved to be good, i.e. a shape in which the girth widening is quicker in the area of the foot and/or at demi-height than at the head of the cooling body.

According to a fifth aspect of the invention, the goal is reached by an interior cooling body for a blown film system with an air guidance parallel to a bolstering stream streaming around the cooling body in use of the system, wherein there is an air outlet at the head of the cooling body which leads the parallel air guidance into the bolstering stream.

It has already been explained that there is often little room inside of the film tube; however, a bolstering stream is to be established wherein beyond the cooling body, i.e. at upwardly extruding plants higher than the cooling body, a widening of the film tube is reached, if possible already at the cooling body.

It has proved to be of advantage to lead a part of the blown air through the cooling body from its foot to its head, and to lead in into the bolstering stream there. As a result, very much air can be pumped through a solid duct inside of the body from its foot to its head. This stream can be controlled almost arbitrarily due to the solid walling. It can especially be controlled up to a very high level. In contrast, the bolstering stream around the cooling body should not be driven too high, because otherwise a risk is taken of widening the film tube in an uncontrolled way.

In order to reach a uniform air output at the head of the cooling body, it is proposed to provide for an air outlet for the parallel air guidance which spreads around the circumference of the cooling body.

According to a sixth aspect of the invention, the goal is reached by an interior cooling body for a blown film system with a multitude of stream whirling elevations with sides which define channels.

As far as the terminology is concerned, it may be explained that a "stream whirling elevation" is to be understood as a macroscopic elevation of at least 3 mm, especially of at least 5 mm, especially of at least 10 mm, which therefore protrudes rather clearly outwardly, especially radially, from the surface of the cooling body. Such an elevation leads to whirling the bolstering stream which runs there in use in the plant. Especially, the stream can be whirled from a laminar status to a turbulent status, or the turbulence can be raised.

By arranging the plurality of elevations in a smart way, a stable air bolster can be produced around the cooling body, so that by regulation of temperature, throughput and extruding material, it can be controlled very well if and where the film tube gets in contact with the cooling body.

Due to the fact that to the sides of the elevations, there are channels, a too high counterpressure for the bolstering stream is avoided. Rather, in providing a network of communicating channels the bolstering stream can be kept strong without much stream resistance, but with high turbulence.

According to a seventh aspect of the invention, the goal is reached by an interior cooling body for a blown film system with a plurality of stream whirling elevations in the shape of rhombi which are inclined relative to a longitudinal extension axis of the cooling body.

It has been explained already that the elevations can strengthen the bolstering stream around the surface of the cooling body. Independent of the presence and shape of the channels, the inventor has found out that the elevations are preferably provided as rhombus-shaped protrusions. A rhombus has four corners, wherein it is to be understood as being "inclined" if a connection between two opposite corners cannot be projected parallel onto the longitudinal axis of the cooling body.

Prototype results, show that also elevations which are coaxial to the longitudinal axis can lead to a good bolstering stream, especially in the shape of quadrangles, especially in the shape of rhombi. However, also an inclination of the geometrical bodies can lead to a good bolstering effect.

It may be underlined that the advantageous effect is not only shown with rhombi. Instead, most polyhedrons proved to give good results, especially areas with triangles, quadrangles, pentagons or with hexagons. The edges between the vortices or corners may be straight, concave and/or convex-shaped.

According to an eighth aspect of the invention, the goal is reached by an interior cooling body for a blown film system with a plurality of stream whirling elevations, which are provided in rows around the nappe of the cooling body, namely in more than 20 rows, preferably more than 30 rows, especially in more than 40 rows.

It has been found out with prototypes that by providing a minimum number of rows, the bolstering stream gets extremely strong. If the blown air passes only a lower number of elevation rows when streaming along the cooling body, e.g. only fifteen or sixteen rows, the bolstering effect may not be stable enough. As soon as more rows are installed, the stability of the bolstering stream becomes highly strengthened.

In a preferred embodiment, the cooling body has an areal ratio of stream whirling elevations versus recesses (the recesses being defined in view of the nappe around the elevations) of maximum 5:1, preferably of maximum 2:1, especially of maximum 1:1.

As far as the terminology is concerned, the ratio of knolls versus the area between the knolls should especially have these values. In a preferred embodiment, the knolls of the elevations comprise surfaces which are at least generally identical with the nappe, i.e. which are part of a circular encircling surface; however, even a surface shape at the elevation which deviates a little from the encircling surface can be understood as a knoll. Especially, the knoll surface can deviate from the encircling surface by for example only, maximum of 5 mm towards the longitudinal axis. Alternatively and additionally, a those areas of the knolls that can also be understood as a knoll are those which deviate from the encircling surface only by 25%, especially by 10%, of the radius difference between highest elevation and deepest channel.

According to this thought, the nappe is portioned into knoll areas and into channels defined among those. The given ratio values are to be kept between these to area sums.

It has proved that these ratio values lead to a very stable bolstering effect, where at the same time, the stream does not have too much of a flow resistance. The surface of the cooling body is rather to be seen as a surface from which stream whirling elevations protrude radially outward, rather than as a surface in which grooves are installed.

The cooling body may widen its girth from a foot area towards a head area, especially in the shape of a frustrum.

Again, it may be pointed out that a "frustrum" is a three-dimensional body with a mathematical definition; however, it is not necessary to build the cooling body exactly or nearly exactly in the preciseness of the mathematical idea or of the physical possibilities. Rather, an advantage is already reached if a widening from the foot towards the head shows, especially in the shape of a barrel.

In a preferred embodiment, the cooling body comprises a nappe which has an at least partially macroscopically structured surface with stream whirling elevations. The advantages of such a structure have been explained above, especially with a difference of at least 5 mm or at least 10 mm between knolls and valley bottoms. The edge between knoll and valley can be designed almost arbitrarily, e.g. with angled or square-cut edges, with flutings, with a curvature or continuous. However, it is desired that the stream channels result radially inwards of the nappe around the knolls, so that the blown air stream can flow rather freely, but at the same time in high turbulence.

It is preferred if the knolls of the elevations are designed rather clearly. Especially, the elevations can define a nappe around the cooling body, wherein the elevations comprise edges with a curvature radius of maximum 3 mm from the knolls towards the channels lying between them. In this design, a rather sharp edge leads from the knoll surfaces to the side walls of the elevations which are the defining walls of the channels.

The bottom of a stream channel can be designed almost arbitrarily. Especially, it can be U-, or V-shaped, or with a rectangular shape.

It is obvious that an interior cooling body according to at least one of the aspects described above is of advantage to the whole blown film system and plant. A high performance with good production quality can be reached.

If in addition to the interior cooling body, an exterior cooling is provided, especially with a cold air fan, the performance can be driven even higher. The cooling body introduced here enables even a cooling air stream on the outside of the film tube, because a strong bolstering effect can be reached inside of the tube.

A cooling body as described above can ideally be used in a process wherein a blown film tube is produced from a thermoplastic synthetic material, wherein the tube is widened by blown air and wherein an interior cooling body is provided inside of the tube, together with a bolstering stream between the tube and the cooling body which avoids a contact between the film and the cooling body at least at the greatest part.

A cooling body with a structured surface can preferably be used for the generation of a turbulent cooling stream.

It is preferred if the bolstering force of the blown air between the cooling body and the blown film is varied in at least one part of the cooling body. By this varying force, a contact between the film and the surface can be reached at a certain point or distance from the foot, preferably in a uniform way around the circumference of the body.

The amount of blown air, the temperature and/or the moisture may be controlled in order to adapt the cooling of the film tube to the desired performance.

A system for producing a blown film from a thermoplastic synthetic material normally comprises a press, an annular slit nozzle, a haul-off with a squeezing roller, a water-worked cooling body and an air deduction from within the film tube above the cooling body. The surface of the cooling body preferably comprises a surface which is provided with communicating stream channels, e.g. with grooves, flutes, recesses, or chamfers. A surface structured in this way can lead to a higher turbulence.

A preferred embodiment has the surface parts remaining amidst the stream channels shaped as rhombi, wherein the longitudinal axis of each rhombus runs essentially parallel to the longitudinal axis of the cooling body. By this arrangement, the streams running along the surface among the rhombi can unite and part, so that high turbulence can be reached in a highly uniform way.

A preferred embodiment of the cooling body has the depth and/or the width of the stream channels over the surface designed in a varying way, wherein the characteristics are the same in view of one distinct circumference strip.

This is of advantage because at one distinct circumference strip there should be uniform stream characteristics. Over the length, a variation can be provided.

BRIEF DESCRIPTION OF THE DRAWINGS

The invention is further explained below in view of the drawing. It shows the single FIGURE schematically shows a longitudinal section through an interior cooling body which is connected with its foot to an annular slit valve, and a blown film tube surrounding the cooling body.

DETAILED DESCRIPTION OF THE PREFERRED EMBODIMENTS

The cooling body 1 is part of a blown film plant, in which plastic material is molten and extruded by an annular slit valve 2 to a fluid film tube 3. The tube 3 is transported in a transport direction 4 essentially parallel to a longitudinal axis 5 of the cooling body 1, and thus of the whole blown film system. By this process, the tube 3 is widened by blown air starting at a foot area 6 of the cooling body 1, and continuing along a head area 7 and further beyond.

In the run of the transport direction 4, the tube 3 cools down, so that it turns hard above the blowing head 8, in praxis most of the time above the head area 7, and can be folded flat and later be rolled.

For the cooling of the moving film of the tube 3, the cooling body 1 is especially used, and if desired an additional exterior cooling system (not shown). The cooling is reached by the surface design of the cooling body 1, the blown air and a water cooling:

The blow blown film tube 3 runs along a surface 9 of the cooling body 1 with a certain distance. This effect is reached by blowing into an annular slit 10 between the cooling body 1 and the film tube 3 a bolstering air stream. For this purpose, in a blown head 8, there is a pressure duct 11, which causes the blown air to take two paths in use, namely one through a first outlet 12 to the interior side of the film tube 3, and at the same time through a second outlet 13 into an annular stream channel within the cooling body 1.

The blown air leaving through the first outlet 12 to the blown film 3 streams along the slit 10 from there, thereby generating a bolstering effect between the blown film tube 3 and the surface 9 of the cooling body 1.

This bolstering air stream moves through the annular slit 10 in the transport direction 4 along the whole cooling body 1 until it reaches the head area 7 of the cooling body 1 and leaves the surface 9 there and streams further upwards within the film tube.

Essentially parallel to this stream, there is a second air stream, which runs through the second outlet 13 of the pressure air duct 11 into the annular stream duct 14 within the interior of the cooling body 1. It runs essentially in the transport direction 4 of the film tube 3 and leaves in the head area 7 of the cooling body 1 through an annular slit 15. There, it reunites with the bolstering stream of the air slit 10 and effects a further widening of the film tube 3 above the head 7. The leaving slit 15 is directed rather radially, namely in an angle of approximately 70° to the axis 5 of the cooling body 1. This arrangement exerts in the area of the head 7 a radially outwardly pointing force onto the film tube 3.

The stream through the interior air guidance 14 can be controlled by the fixed or variable design of the outlets 12, 13 of the pressure air duct 11, especially its ratio to the bolstering stream through the annular slit 10.

The bolstering stream in the slit 10, i.e. between the surface 9 and the film tube 3, cools down the tube 3. This result is reached by the blown air taking heat energy from the film tube 3 and passing it on to the cooler surface 9 of the cooling body 1. As shown in the figure, a cooling fluid areal guidance 16 is provided inwardly of the nappe jacket 9. The cooling fluid areal guidance 16 includes an annular cross section with an air guidance 14 provided therein. In order to keep the surface 9 of the cooling body 1 rather cool, there is provided cooling water in an annular water duct which is in areal contact to the surface 9. The cooling water is permanently renewed through a central channel 17 and a there located water lead 18 in a pump direction 19 in use of the plant. The cooling water—or generally: the cooling fluid—is thus kept in a counter stream to the bolstering air stream in the annular slit 10 at the inside of a jacket 20 of the cooling body 1. It takes from the jacket 20 at the radial inside 21 the heat energy which the jacket 20 hat taken with its surface 9, i.e. the outside, from the bolstering stream in the annular slit 10.

The heat energy of the film tube 3 is thus transported into the cooling stream and from there through a deduction hole 22 out of the cooling body 1.

It may be understood that as well the bolstering effect in the annular slit 10 as well as the heat transport performance from the bolstering stream to the cooling body both depend on the quality and on the quantity of the air stream. At the surface 9 of the cooling body 1, there is thus a special three-dimensional geometry. The whole surface 9 is designed with rhombus-shaped elevations. The jacket 20 of the cooling body 1 is cast in this shape, or a channel geometry has been milled from an originally thicker jacket.

The rhombi 30 protrude into the annular slit 10 and cause a whirling of passing blown air. Their rhombus-shaped surfaces lie in the circumference surface of the body 1, therefore defining the surface 9 of the jacket 20.

At side edges 31 of the rhombus-shaped elevations, the outer shape of the jacket 20 of the cooling body 1 turn with a curvature radius of approx. 1 mm to 2 mm away from the surface to a wall running radially inwards. It may be stressed that the three-dimensional form of the elevations is not shown in the drawing, which is to be understood as a sketch.

The side walls of the elevations 30 run over a distance of approx. 1 cm to 2 cm approx. radially to the central axis 5. Between every two neighboring elevations (see 32, 33), the side walls form a valley 34. This valley can run curved, e.g. in a U-shape.

The macroscopic structure of the surface 9 in form of the elevations 30, 32, 33 generate a strong turbulence in the bolstering stream in the slit 10. This enlargens the force onto the film tube 3. Same can thus be extruded in a high speed without risking uncontrolled contact to the surface 9 of the cooling body 1.

As a result of the cooling water stream along the interior side of the jacket 20 of the cooling body 1, namely in the double-walled guidance between the outer wall 20 and an inner wall 35, the heat is transferred effectively. At the same time, the water cooling is supported by the blown air passing along its radial inside 36.

In other words the film tube coming from the annular slit valve is kept away from the bottle-like cooling body by the bolstering stream. Between the jacket, i.e. the outer wall of the cooling body, and the inner wall, there is an annular clearance, in which a cooling media can be introduced, e.g. water. This cooling media is supplied through a lead and is discharged through the discharge lead at the bottom of the cooling body.

The surface of the cooling body is equipped with rhombi, among which there are stream clearances connected among each other. The longitudinal axis of the rhombi runs essentially in the lengthwise direction of the cooling body. The stream clearances are provided as grooves, flutes, recesses or other channels. A cooling ring guides air to the outer side of the tube in order to additionally cool same from the outside. In the upper part of the cooling body, there is a discharge slit for the air introduced in the inside of the annular slit valve, so that this air leads to a further widening of the tube beyond the cooling body. This further air guidance can be much larger than the air volume from the annular slit valve at the bottom of the cooling body.

In a distinct distance from the bottom of the cooling body, the air stream ways are constructed uniformly around a nappe strip, so that different influences on the film tube around the circumference are avoided. Along the longitude of the cooling body, however, the air stream ways can be designed differently, e.g. deeper and wider in order to give the streaming air room for swerving which makes the bolstering force of the air weaker so that the tube can come closer to the cooling body. If the streaming ways are shallower, then the bolstering force of the air is enhanced, and the tube is pushed further away from the cooling body.

The invention claimed is:

1. An interior cooling body for a blown film system comprising:
    (a) a longitudinal extension;
    (b) a nappe jacket;
    (c) a plurality of stream channels provided in the nappe jacket extending over at least a part of the longitudinal extension; and
    (d) a plurality of stream whirling elevations in the shape of rhombi which are inclined with respect to the longitudinal extension.

2. The interior cooling body according to claim 1, further comprising a cooling fluid areal guidance inwardly of the nappe jacket, wherein the cooling fluid areal guidance comprises an annular cross section with an air guidance provided therein.

3. The interior cooling body according to claim 2, wherein in the air guidance, a cooling fluid lead is provided, which is connected to the cooling fluid areal guidance.

4. The interior cooling body according to claim 1, further comprising a cooling fluid areal guidance with an annular cross section in a double-walled jacket.

5. The interior cooling body according to claim 1, with a length of at least approx. 0.5 m up to approx. 3 m, and with a frustrum shape.

6. The interior cooling body according to claim 1, further comprising an air guidance parallel to a bolstering stream around the cooling body, with an air outlet at a head, which leads the parallel air guidance into the bolstering stream.

7. The cooling body according to claim 6, wherein the air outlet is spread circumferentially over the head (7).

8. The interior cooling body according to claim 1, wherein the plurality of stream whirling elevations have sides defining channels.

9. The interior cooling body according to claim 1, wherein the plurality of stream whirling elevations are provided in at least 20 rows over a nappe girth of the nappe.

10. The interior cooling body according to claim 9, further comprising an areal ratio of a maximum of 5:1 between the stream whirling elevations and recesses provided with respect to the nappe around the stream whirling elevations.

11. The interior cooling body according to claim 1 having a girth widening from a foot area towards a head area.

12. The interior cooling body according to claim 1, wherein the stream whirling elevations provide the nappe with an at least partially macroscopically structured surface.

13. The interior cooling body according to claim 12, wherein the stream whirling elevations comprise edges with a radius of curvature radius of no more than 3 mm at a transition to the channels.

14. A blown film system comprising:
   (a) a press;
   (b) an annular slit nozzle;
   (c) a haul-off with a squeezing roller;
   (d) an interior cooling body; and
   (e) an air deduction from within a film tube above the interior cooling body;
   wherein the interior cooling body comprises a longitudinal extension, a nappe jacket, a plurality of stream channels provided in the nappe jacket extending over at least a part of the longitudinal extension, and a plurality of stream whirling elevations in the shape of rhombi which are inclined with respect to the longitudinal extension.

15. The blown film system according to claim 14, further comprising an exterior cooling.

* * * * *